(12) United States Patent
Miron et al.

(10) Patent No.: US 9,420,764 B2
(45) Date of Patent: Aug. 23, 2016

(54) MANUFACTURE OF MODULAR LEASHES

(71) Applicant: Tuenne LLC, Greenwich, CT (US)

(72) Inventors: Nicholas Peter Okun Miron, Greenwich, CT (US); Alan Ackley, Mission Viejo, CA (US)

(73) Assignee: Tuenne LLC, Greenwich, CT (US)

(*) Notice: Subject to any disclaimer, the term of this patent is extended or adjusted under 35 U.S.C. 154(b) by 148 days.

(21) Appl. No.: 13/953,842

(22) Filed: Jul. 30, 2013

(65) Prior Publication Data

US 2015/0033542 A1 Feb. 5, 2015

(51) Int. Cl.
*A01K 27/00* (2006.01)
*B23P 11/00* (2006.01)

(52) U.S. Cl.
CPC .......... *A01K 27/003* (2013.01); *A01K 27/005* (2013.01); *B23P 11/005* (2013.01); *Y10T 29/49826* (2015.01); *Y10T 29/49844* (2015.01); *Y10T 29/49872* (2015.01); *Y10T 29/49904* (2015.01); *Y10T 29/49908* (2015.01); *Y10T 29/49925* (2015.01); *Y10T 29/49947* (2015.01); *Y10T 29/49963* (2015.01); *Y10T 29/49966* (2015.01); *Y10T 29/49968* (2015.01)

(58) Field of Classification Search
CPC . A01K 27/003; A01K 27/005; B23P 11/005; Y10T 29/49904; Y10T 29/49844; Y10T 29/49826; Y10T 29/49872; Y10T 29/49968; Y10T 29/49966; Y10T 29/49963; Y10T 29/49947; Y10T 29/49908
See application file for complete search history.

(56) References Cited

U.S. PATENT DOCUMENTS

| 396,015 | A | | 1/1889 | Thomson | |
|---|---|---|---|---|---|
| 2,942,748 | A | * | 6/1960 | Anderson | 156/72 |
| 4,456,451 | A | * | 6/1984 | Vosper | B29C 57/10 249/78 |
| 4,662,056 | A | | 5/1987 | Becker | |
| 8,191,347 | B2 | * | 6/2012 | Nagode | D07B 1/148 57/210 |
| 8,297,234 | B2 | | 10/2012 | Miron | |
| 2013/0017011 | A1 | | 1/2013 | Miron | |

OTHER PUBLICATIONS

International Search Report and Written Opinion issued by the U.S. Patent and Trademark Office as International Searching Authority for corresponding International Application No. PCT/US2013/52716 mailed Nov. 14, 2013 (12 pgs.).

* cited by examiner

*Primary Examiner* — John C Hong
(74) *Attorney, Agent, or Firm* — Wilmer Cutler Pickering Hale and Dorr LLP

(57) ABSTRACT

Methods for manufacturing modular leashes are disclosed. The modular leashes may comprise a flexible portion including a lead end and a handle portion. Manufacturing the flexible portion may comprise heating a pin and securing the pin to a lead end, so as to melt the lead to the pin using ambient heat from the pin. In some embodiments, heating the pin uses induction heating. Manufacturing the flexible portion may further comprise inserting the lead end into a sleeve, and securing the lead to the sleeve by crimping the sleeve onto the lead. Manufacturing the handle portion may comprise inserting handle ends into a first end of a sleeve and inserting a fastener into the handle ends. Manufacturing the handle portion may further comprise inserting a fitting into a second end of the sleeve so that a space between the sleeve and the fitting may receive the handle ends.

20 Claims, 22 Drawing Sheets

MANUFACTURE OF MODULAR LEASHES

FIELD OF THE DISCLOSURE

The present disclosure relates generally to modular leashes, and specifically to methods for manufacturing modular leashes.

BACKGROUND

Animals, such as dogs, benefit from regular exercise and activity. Leashes allow owners to control their animals while the animals exercise. Otherwise, if uncontrolled, the animals could run away, get lost, or harm other people, objects, or animals. Alternatively, the animals could be injured inadvertently by oncoming traffic, or endanger traffic themselves. Leashes also allow owners to prevent their animals from soiling inappropriate places or digging up lawns or parks. Leashes help prevent animals from frightening or biting people or other animals, and help protect the animals from the same. Advantageously, leashes provide clear methods of communication and ensure control during training of animals.

A modular leash is made up of multiple components. For example, a modular leash may be separated into a handle portion, a flexible portion, and a collar portion. A modular leash allows a leash owner to purchase spare parts easier and/or cheaper than replacing an entire leash. A modular leash also allows a leash owner to purchase aesthetically pleasing designs, and keep spare components in different preferred designs. Modular leashes may allow connection to people or objects, instead of or in addition to animals. For example, modular leashes may be used as a toddler leash to ensure that young children do not wander far away from their guardians. Modular leashes may also be used as key leashes or lanyards to keep keys attached to other items such as handbags or bracelets. Modular leashes are described in U.S. Pat. No. 8,297,234, entitled "Modular Leash System," filed Apr. 9, 2009, the entire contents of which are expressly incorporated by reference herein. Additional components for modular leashes, such as detanglers, are described in U.S. patent application Ser. No. 13/183,332, entitled "Detangling Device, Method of Making and Using the Same," filed Jul. 14, 2011, the entire contents of which are expressly incorporated herein.

SUMMARY

In accordance with the disclosed subject matter, methods are provided for manufacturing modular leashes and portions thereof.

Certain embodiments include methods for manufacturing a flexible portion of a modular leash. The methods comprise providing a lead and a pin, where the lead comprises at least one end, and where the lead comprises a flexible material. The methods further comprise heating the pin and securing the heated pin to the at least one lead end, to at least partially melt the lead to the pin using ambient heat from the heated pin.

The embodiments described herein may include additional aspects. For example, the methods may further comprise providing a sleeve; inserting the at least one lead end into the sleeve, the sleeve surrounding at least a portion of the at least one lead end; and securing the at least one lead end to the sleeve by crimping the sleeve to the at least one lead end. Some aspects include the pin defining ridges. In other aspects, the step of heating the pin further comprises using induction heating. Some aspects include the pin and the sleeve being combined into a single component.

Certain embodiments include methods for manufacturing a flexible portion of a modular leash. The methods comprise providing a lead and a sleeve, where the lead comprises at least one end, and where the lead comprises a flexible material. The methods further comprise securing the sleeve to the at least one lead end and heating the sleeve, to at least partially melt the lead to the sleeve using ambient heat from the heated sleeve.

The embodiments described herein may include additional aspects. For example, the sleeve may comprise a plurality of holes, and the methods may further comprise creating opposing holes in the lead end to correspond with the plurality of holes in the sleeve, the plurality of holes for receiving at least one fastener. Some aspects include the sleeve comprising at least one of aluminum, steel, brass, and titanium. In some aspects, the step of heating the sleeve further comprises using induction heating. Some aspects include the lead comprising at least one of a rope, a chain, a lead line, and a tether. In some aspects, the lead comprises at least one of plastic, nylon, webbing, polypropylene, hemp, chain, polyurethane, leather, rubber, and synthetic materials.

Certain embodiments include methods for manufacturing a handle portion of a modular leash. The methods comprise providing a sleeve, a fastener, and a handle, where the handle comprises a plurality of ends, and where the handle further comprises a flexible material. The methods further comprise inserting the handle ends into a first end of the sleeve, wherein the sleeve surrounds at least a portion of the handle ends. The methods further comprise inserting the fastener into the handle ends, such that the handle ends at least partially surround the fastener and the sleeve at least partially surrounds the fastener and the handle ends.

The embodiments described herein may include additional aspects of the present invention. For example, the fastener may secure the handle ends to the sleeve. In some aspects, the methods further comprise providing a fitting; and inserting the fitting into a second end of the sleeve, where the fitting secures the handle ends to the sleeve. Some aspects include the fastener and the fitting being combined into a single component. In some aspects, the fitting comprises at least one of a frustum, a cylinder, and a geometrical solid. Some aspects include the fitting comprising at least one of aluminum, steel, brass, and titanium. In some aspects, the flexible material of the handle comprises at least one of nylon, polyester, and cotton.

BRIEF DESCRIPTION OF THE DRAWINGS

Various objects, features, and advantages of the present disclosure may be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

In general, the present disclosure includes methods for manufacturing modular leashes. The modular leashes may comprise a flexible portion including a lead end, and a handle portion. Manufacturing the flexible portion may comprise heating a pin and securing the heated pin to a lead end, so as to at least partially melt the lead to the pin using ambient heat from the pin. In some embodiments, heating the pin uses induction heating. Manufacturing the flexible portion may comprise inserting a lead end into a sleeve, and securing the lead end to the sleeve by crimping the sleeve onto the lead end. Manufacturing the handle portion may comprise inserting handle ends into a first end of a sleeve and inserting a fastener into the handle ends. Manufacturing the handle portion may further comprise inserting a fitting into a second end of the sleeve so that a space between the sleeve and the fitting is capable of receiving the handle ends.

Modular Leash

Figure 1:
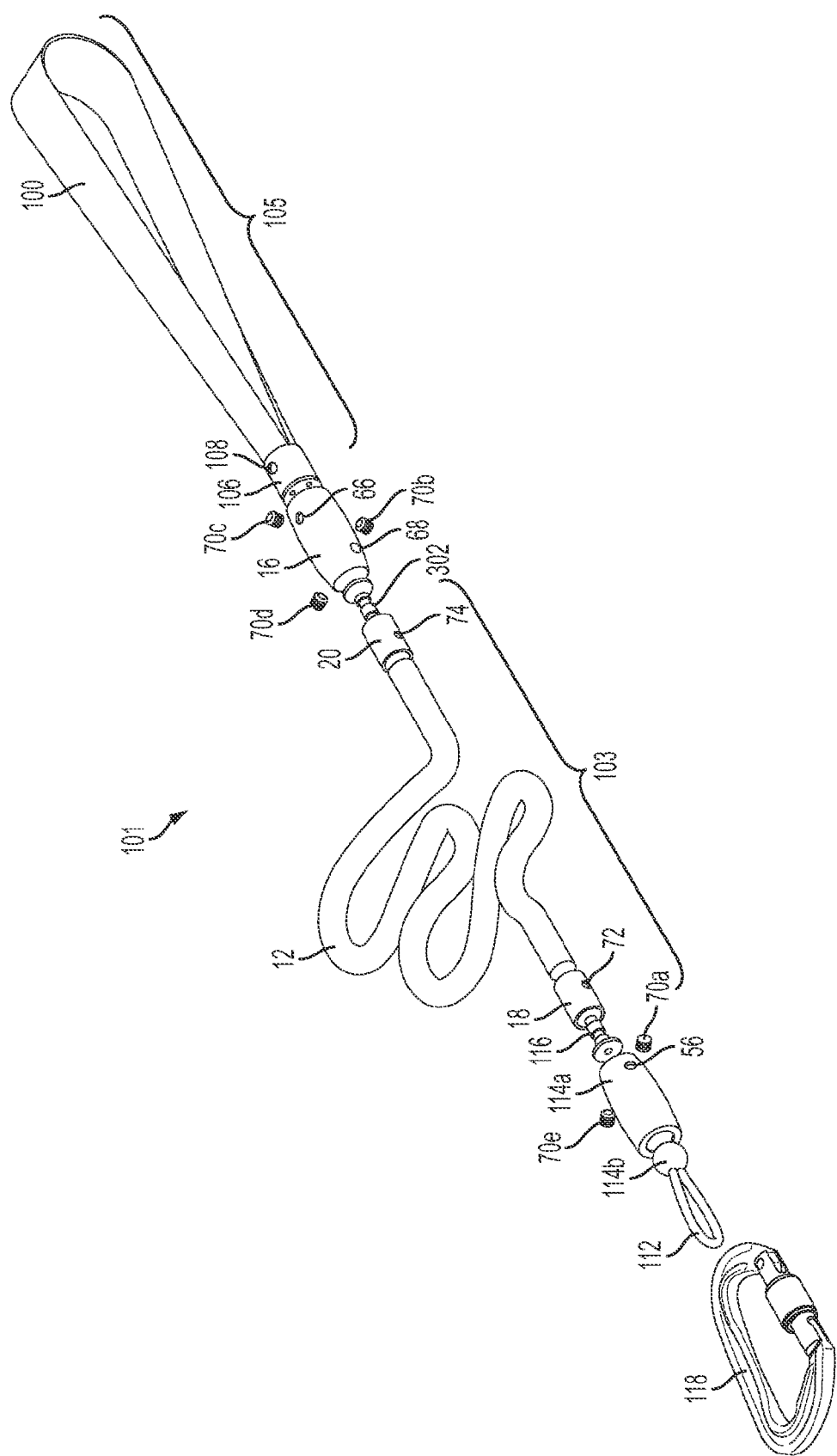
FIG. 1 illustrates an embodiment of a modular leash.

Turning to the figures, FIG. 1 illustrates an embodiment of a modular leash. Modular leash 101 comprises flexible portion 103 and handle portion 105. Flexible portion 103 comprises lead 12 and sleeves 18, 20. In some embodiments, lead 12 comprises a flexible material such as a rope, a chain, a lead line, or a tether. Handle portion 105 comprises handle 100 coupled to sleeve 106, which has holes 108.

In some embodiments, lead 12 comprises any flexible material. For example, the flexible material comprises rope, webbing, leather, synthetic materials, or other flexible materials. Lead 12 may comprise rope made from various materials (e.g., nylon, polypropylene, hemp, chain, acrylic polyurethane, leather, rubber, and the like) and have various configurations (e.g., a braided sheath over a braided or non-braided core, solid braid, twisted, or the like). Further embodiments include lead 12 comprising rock climbing rope. Rock climbing rope generally comprises a braided outer sheath surrounding either a braided or a filament core. Examples of rock climbing rope are available from Black Diamond Equipment Ltd., and Petzl, for example sold under the trade name Sterling rope.

Some embodiments include end caps 114a, 16 arranged to be removably attachable to at least one end of lead 12 at sleeves 18, 20. In addition to sleeves 18, 20, modular leash 101 may also include sleeve 106. Sleeve 106 attaches handle portion 105 to end cap 16. Detangler 114b attaches loop 112 to end cap 114a. Sleeves 18, 20, 106 may comprise rigid end portions. Sleeves 18, 20, 106 are described in greater detail in connection with FIG. 8. End caps 16, 114a contain holes 66, 68, 56. Sleeves 18, 20 contain holes 72, 74. Sleeves 18, 20 may be secured to lead 12 using pins 302, 116. Fasteners 70a-e may be used to connect end caps 16, 114a to sleeves 18, 20. Sleeves 18, 20 are insertable into end caps 16, 114a such that the respective holes align. For example, sleeve 106 is insertable into end cap 16 so that hole 108 aligns with hole 66. Fastener 70c secures sleeve 106 to end cap 16 through the aligned holes. Insertion of sleeve 106 into end cap 16 is described in further detail in connection with FIG. 22.

Various accessories may be removably attachable to lead 12 via end caps 14, 16. Non-limiting examples of accessories may include leash handles (e.g., allowing lead 12 to be coupled to handle 100 via end cap 16), collar connectors (e.g., allowing lead 12 to be coupled to an animal collar via end cap 114a and via a collar connector such as loop 112), detanglers (e.g., allowing lead 12 to be coupled to detangler 114b via end cap 114a and via loop 112), carabiners (e.g., allowing lead 12 to be coupled to carabiner 118 via end cap 114a and via loop 112), harnesses (e.g., allowing lead 12 to be coupled to a harness via end cap 114a and via loop 112), halters (e.g., allowing lead 12 to be coupled to a halter via end cap 114a and via loop 112), and the like. Other example accessories may include sailing shackles or rope animal collars.

Handle portion 105 may comprise handle 100 and sleeve 106. Handle 100 may comprise various configurations. For example, handle 100 comprises a loop of fabric webbing, e.g., which is removably attachable to end cap 16. In further embodiments, handle 100 comprises a buckle (e.g., such as a Fastex-style side-release buckle). The buckle allows handle 100 to be placed selectively in a closed loop configuration and/or an open configuration, e.g., by alternatively buckling and un-buckling the buckle. As such, the buckle allows handle 100 to be secured to an object, such as a tree, pole, post, or other object.

In some embodiments, handle 100 comprises a layered structure. For example, handle 100 comprises a layer of nylon webbing and a layer of Hypalon® coated nylon, having an intermediate fabric layer therebetween. (Hypalon is a registered trademark for a chlorosulfonated polyethylene (CSPE) synthetic rubber (CSM) available from DuPont Performance Elastomers.) The intermediate fabric layer comprises any of various fabrics, including, but not limited to, nylon fabric, polyester fabric, cotton fabric, and other flexible fabrics. The Hypalon material may be laser cut or die punched to achieve a desired shape or pattern. The cut Hypalon and the various other layers are fastened together, e.g., via stitching, adhesive bonding, or other suitable fastening method. Further embodiments include handle 100 comprising a molded plastic component or a fabric component that is over-molded with a plastic material (e.g., an elastomer to improve gripping the handle, etc.).

In some embodiments, modular leash 101 allows connection to people or objects, instead of or in addition to animals. For example, modular leash 101 may be used as a toddler leash to ensure that young children do not wander far away from their guardians. Loop 112 may be connected to a harness holding the toddler. Modular leash 101 may also be used as a key leash or lanyard to keep keys attached to other items such as handbags and/or bracelets.

Flexible Portion Including Lead

Figure 2A:
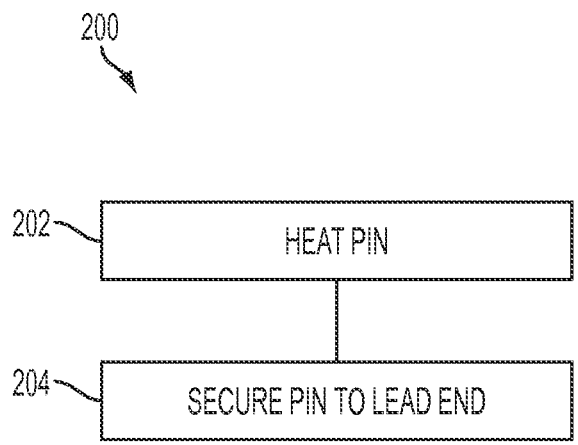
FIGS. 2A-2B illustrate example methods for manufacturing the modular leash.
Figure 2B:
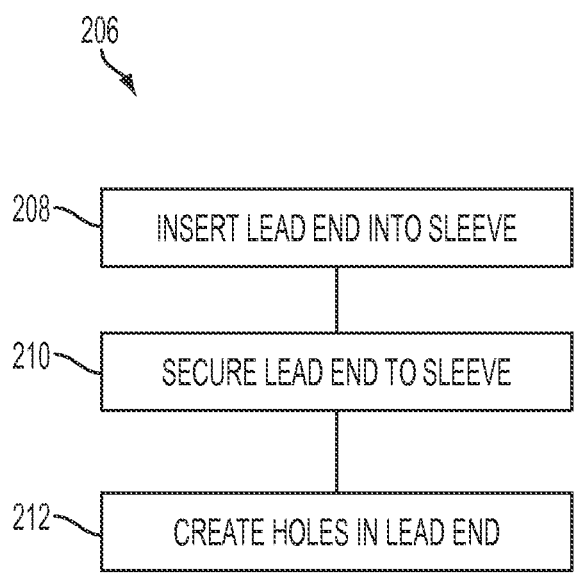

FIGS. 2A-2B illustrate example methods 200, 206 for manufacturing modular leash 101. FIG. 2A illustrates example method 200 for manufacturing a portion of modular leash 101. In particular, FIG. 2A illustrates an example method 200 for manufacturing modular leash 101. FIG. 2A illustrates example method 200 for manufacturing flexible portion 103 for modular leash 101 (shown in FIG. 1) using pin 302 (shown in FIG. 3) in accordance with certain embodiments. Method 200 comprises heating pin 302 (step 202). In some embodiments, method 200 comprises using induction heating to heat pin 302. Heating pin 302 is described in further detail later in connection with FIG. 3. Method 200 also comprises securing heated pin 302 to an end of lead 12 (step 204). In some embodiments, method 200 comprises inserting the heated pin 302 into the lead end 12. In further embodiments, securing heated pin 302 to lead end 12 comprises using ambient heat from heated pin 302 to melt lead 12 at least partially. In some embodiments, pin 302 comprises cap 402 (shown in FIG. 4). In further embodiments, securing heated pin 302 to lead end 12 comprises using ambient heat from heated cap 402 to at least partially melt lead end 12 to cap 402.

FIG. 2B illustrates an example method 206 for manufacturing modular leash 101. FIG. 2B illustrates example method 206 for manufacturing flexible portion 103 for modular leash 101 using sleeve 20 (shown in FIG. 1) in accordance with certain embodiments. Method 206 comprises inserting lead end 12 into sleeve 20 (step 208). An example sleeve 20 is described below in connection with FIGS. 8 and 9. Method 206 also comprises securing lead end 12 to sleeve 20 (step 210). Some embodiments include securing lead end 12 to sleeve 20 by crimping sleeve 20 onto lead end 12. In some embodiments, method 206 further comprises creating holes in lead end 12 (step 212). Sleeve 20 contains opposing holes 74 for receiving at least one fastener 70b such as a set screw. Fastener 70b helps secure sleeve 20 to end cap 16 for connection with the remainder of modular leash 101 (shown in FIG. 1). Creating holes 74 in lead end 12 is described in further detail in connection with FIG. 9.

In some embodiments, the present methods comprise performing both method 200 and method 206 to manufacture modular leash 101. For example, embodiments of the present methods comprise inserting lead end 12 into sleeve 20, and inserting heated pin 302 into the combined lead end 12 and sleeve 20. Advantageously, pin 302 and sleeve 20 interact cooperatively to secure lead end 12. Ambient heat from pin 302 at least partially melts lead end 12 to pin 302 and at least partially melts lead end 12 to cap 402 of pin 302 (shown in FIG. 4). Accordingly, the present methods also comprise securing sleeve 20 to lead end 12 by crimping sleeve 20 to the combined lead end 12 and heated pin 302.

Figure 3A:
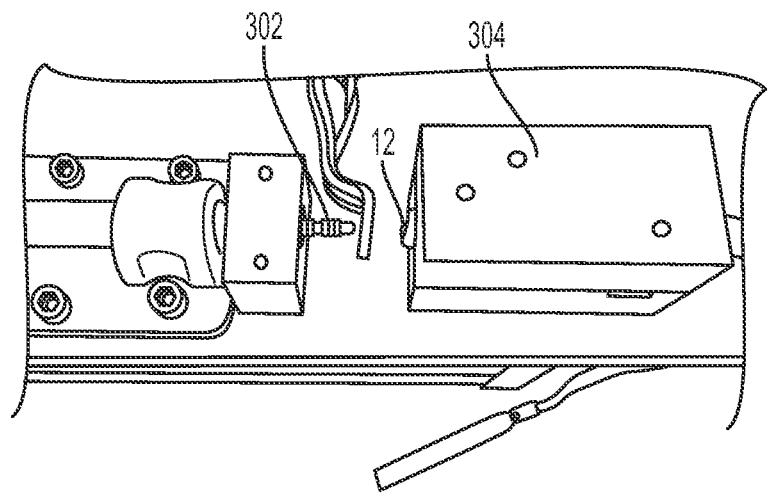
FIGS. 3A-3B illustrate an example step for manufacturing the modular leash.
Figure 3B:
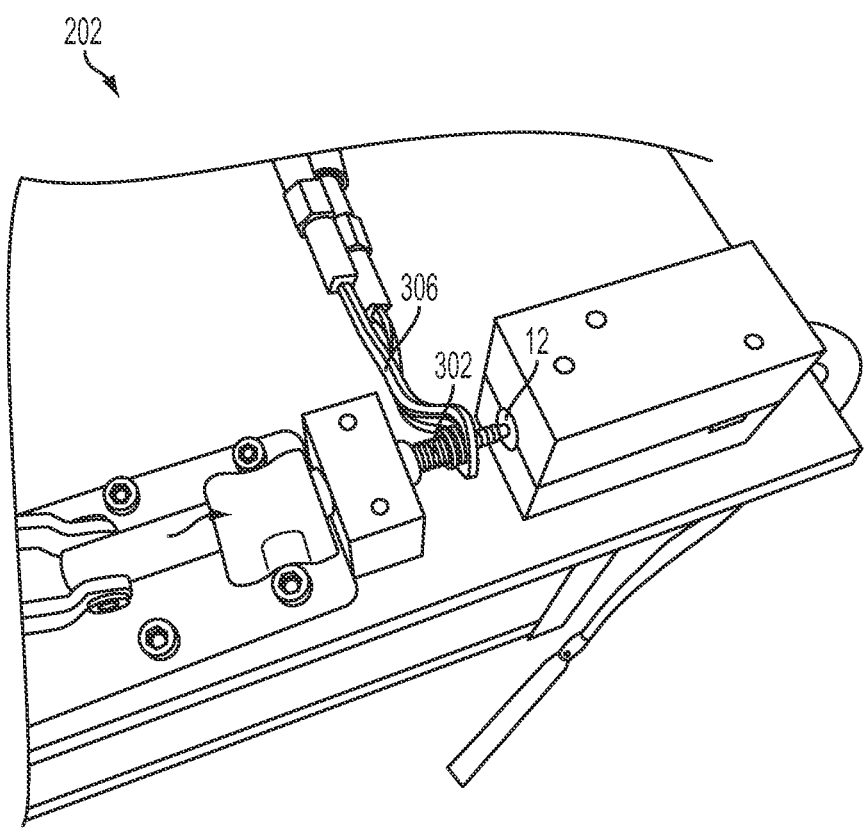

FIGS. 3A-3B illustrate an example step for manufacturing modular leash 101. In particular, FIG. 3A illustrates a top-facing view of preparing lead end 12 to receive heated pin 302 in accordance with certain embodiments. Block 304 holds lead end 12 securely so that pin 302 may be inserted into a center of lead end 12 along a longitudinal axis. In some embodiments, block 304 is made of aluminum, steel, brass, titanium, or another material capable of holding lead end 12 securely during manufacturing.

FIG. 3B illustrates an example step 202 for manufacturing a modular leash. FIG. 3B includes pin 302, lead end 12, and induction coil 306. In some embodiments, heating pin 302 uses induction heating. Induction heating refers to a process of heating an electrically conductive object using electromagnetic induction. The electrically conductive object may be a metal such as iron or alloys thereof. The electromagnetic induction generates currents within the electrically conductive object, called Foucault currents. Induction coil 306 induces currents inside pin 302 or another electrically conductive object. Resistance to the induced currents within the electrically-conductive object leads to heating of the electrically conductive object. For example, objects comprising magnetic materials resist the alternating electromagnetic field of induction coil 306 more readily than non-magnetic materials. Therefore, objects comprising magnetic metals heat more readily using induction heating than objects comprising non-magnetic materials. Advantageously, use of induction heating allows for targeted heating of pin 302 by allowing for precise control of a desired temperature and amount of time for securing pin 302 to lead end 12.

Non-limiting example configurations for an induction heating machine for heating induction coil 306 include a set point of about 240 amps, an output level of about 700 watts, an output frequency of about 330 kHz, and a cycle time of about 4 seconds. For example, the set point is 240.6 amps, the output level is 706 watts, the output frequency is 329 kHz, and the cycle time is 3.95 seconds.

Figure 4:
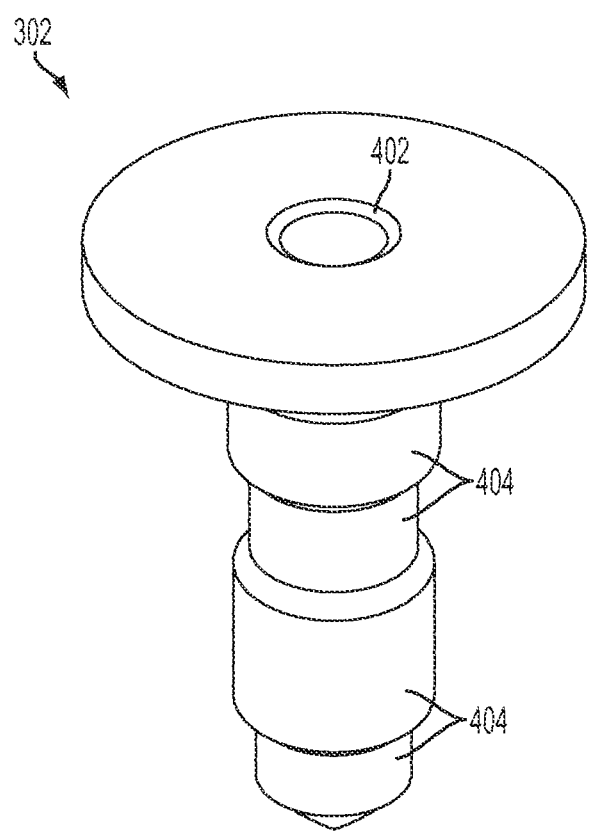
FIG. 4 illustrates embodiments of a component of the modular leash.

FIG. 4 illustrates embodiments of a component of modular leash 101. In some embodiments, pin 302 comprises ridges 404 and cap 402. Advantageously, cap 402 helps further secure pin 302 to lead end 12 (shown in FIG. 1). When pin 302 is heated, cap 402 allows pin 302 to make additional contact with lead end 12, which provides more surface area to help melt lead end 12 at least partially, and adhere pin 302 to lead end 12 once lead end 12 cools. Similarly, ridges 404 help further secure pin 302 to lead end 12. When pin 302 is heated, ridges 404 increase the amount of available surface area and allow pin 302 to make additional contact with the interior of lead end 12. Accordingly, ridges 404 help to secure lead end 12 to pin 302 by allowing lead end 12 to melt at least partially, and adhere to ridges 404 once lead end 12 cools.

Figure 5:
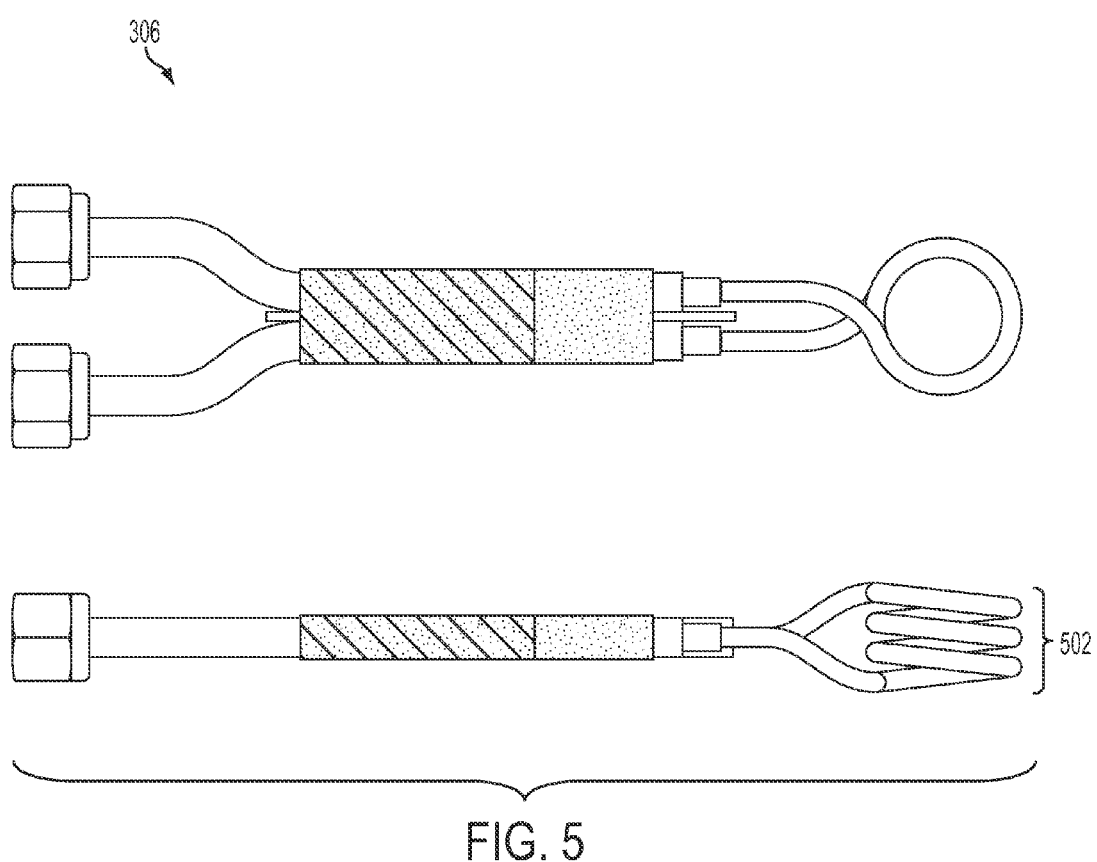
FIG. 5 illustrates embodiments of a component for manufacturing the modular leash.

FIG. 5 illustrates embodiments of a component for manufacturing modular leash 101. Induction coil 306 comprises coils 502. In some embodiments, the amount of heat induced and the speed with which the heat may be produced is based on factors associated with coils 502. Non-limiting examples of relevant factors include (1) the radius of coils 502, (2) the number of coils 502, (3) the distance between coils in coils 502, (4) the distance from coils 502 to the electricity source, (5) the material comprising coils 502 and/or pin 302, and (6) the distance, or "coupling," from coils 502 to pin 302.

Figure 6:
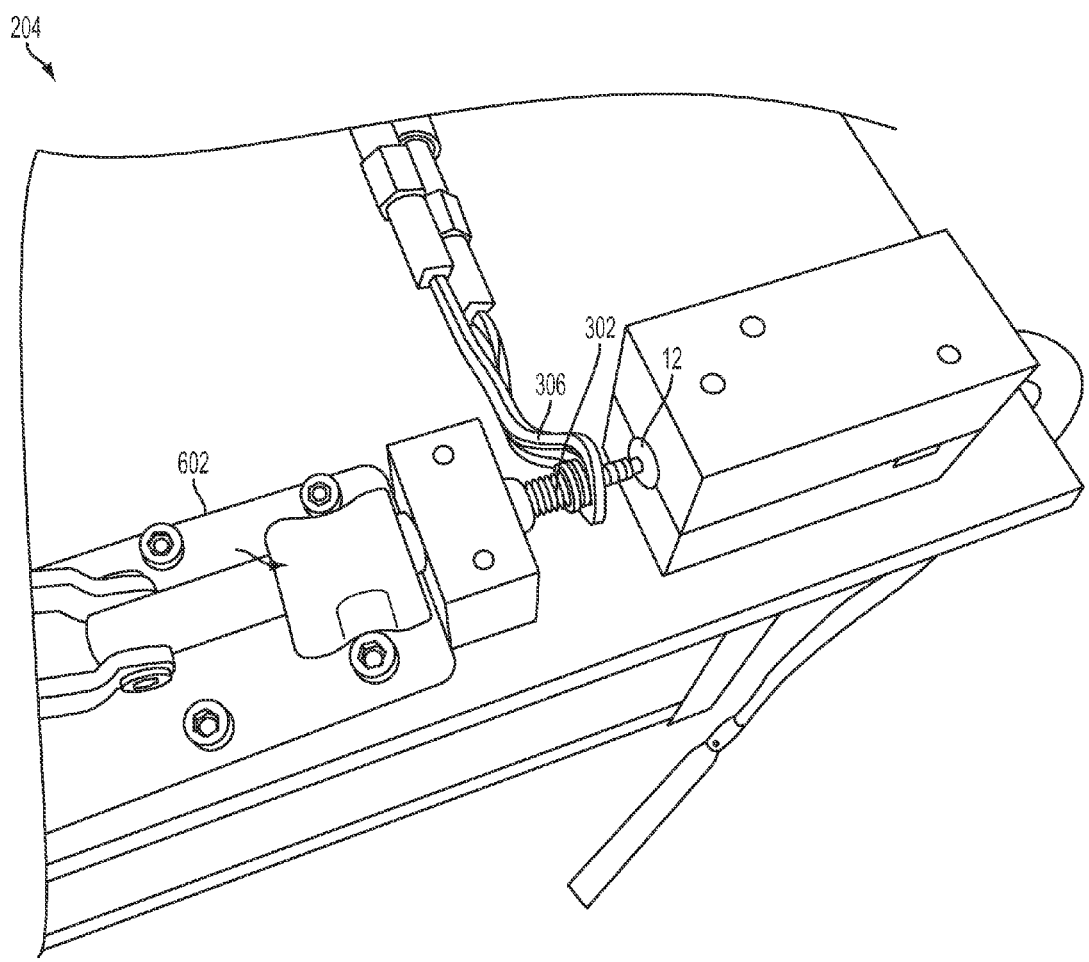
FIG. 6 illustrates an example step for manufacturing the modular leash.

FIG. 6 illustrates an example step 204 for manufacturing modular leash 101. FIG. 6 includes pin 302, lead end 12, induction coil 306, and machine 602. As described earlier, some embodiments include using induction heating to heat pin 302 in preparation for securing pin 302 to lead end 12 of modular leash 101 (shown in FIG. 1). To secure pin 302 to lead end 12, machine 602 moves heated pin 302 forward until cap 402 of pin 302 (shown in FIG. 4) is flush with lead end 12. Induction coil 306 and the induction heating generally may be turned off once cap 402 is flush with lead end 12, meaning that pin 302 is longitudinally inside the center of lead end 12. As described earlier, ambient heat from the induction heating proceeds to melt lead end 12 at least partially. When lead end 12 has cooled and set, lead end 12 is secured to pin 302.

Figure 7:
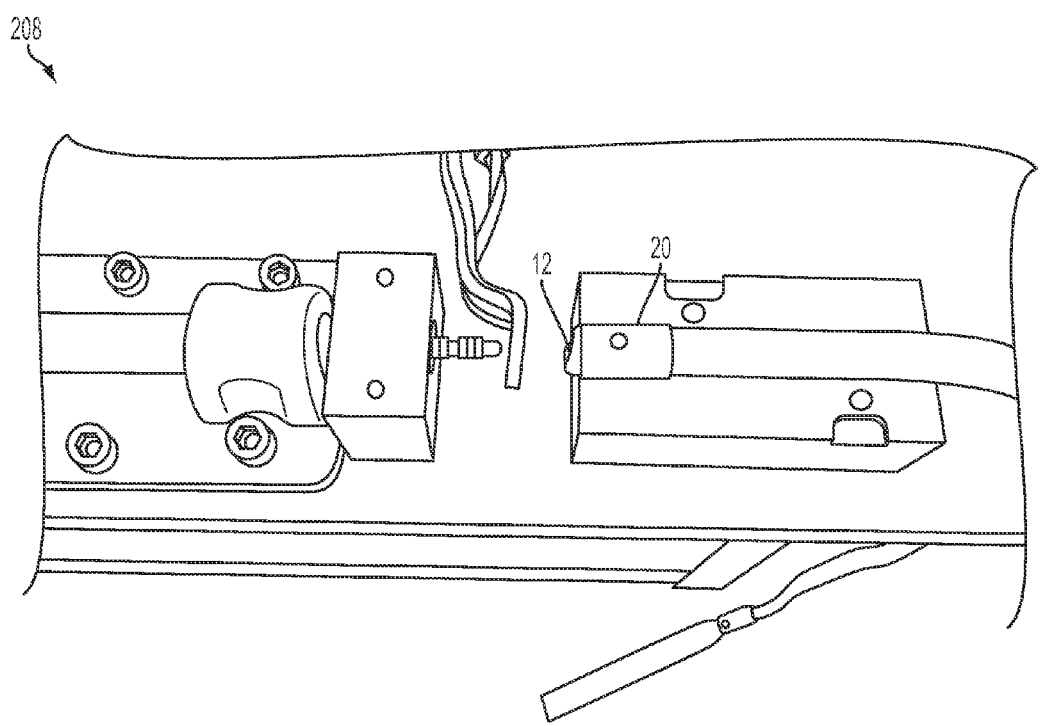
FIG. 7 illustrates an example step for manufacturing the modular leash.

FIG. 7 illustrates an example step 208 for manufacturing modular leash 101. As described earlier, in some embodiments lead end 12 comprises a rope end. Lead end 12 is inserted at least partially into sleeve 20. Advantageously, sleeve 20 allows lead end 12 to attach to other components in modular leash 101 when manufacturing modular leash 101. For example, sleeves such as sleeves 106, 20, 18 may be coupled to components such as end caps 16, 114a (shown in FIG. 1) to form modular leash 101.

Figure 8A:
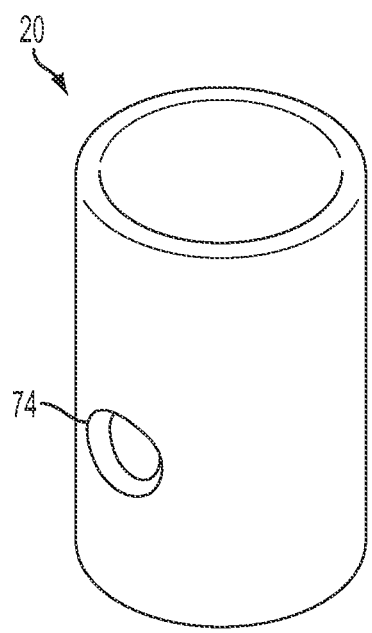
FIGS. 8A-8B illustrate embodiments of a component of the modular leash.
Figure 8B:
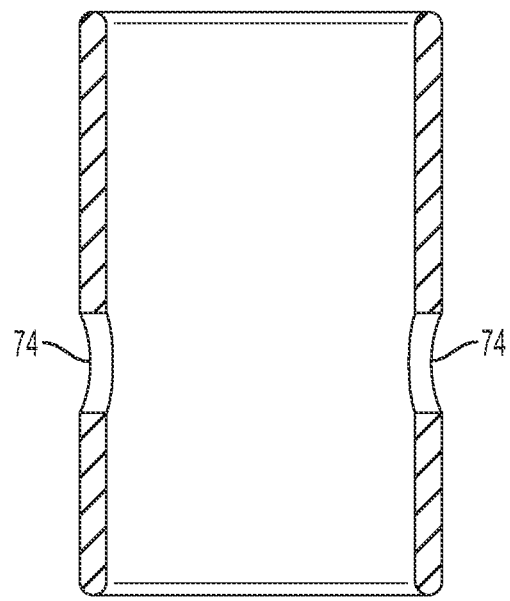

FIGS. 8A-8B illustrate embodiments of a component of modular leash 101. Sleeve 20 includes holes 74. In some embodiments, holes 74 are used for receiving fastener 70b (shown in FIG. 1) to connect sleeve 20, and lead end 12 secured therein (also shown in FIG. 1) to end cap 16 (also shown in FIG. 1). Non-limiting examples of fastener 70b include roll pins, screws, set screws, and/or bullet locks. Bullet locks comprise a ball bearing mounted on a spring that locates a dimple and/or hole in sleeve 20 to allow for generally quick release.

Figure 9:
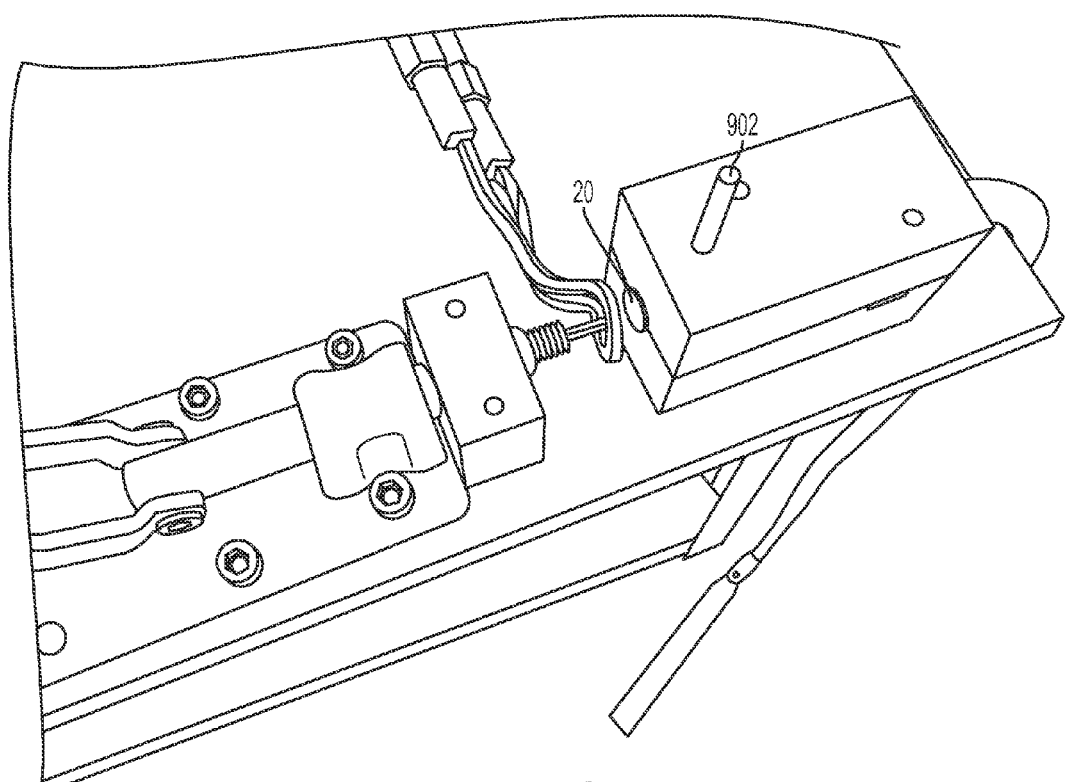
FIG. 9 illustrates an example step for manufacturing the modular leash.

FIG. 9 illustrates an example step 210 for manufacturing modular leash 101. FIG. 9 includes sleeve 20 and punch 902. In some embodiments, step 210 of securing lead end 12 to sleeve 20 comprises crimping sleeve 20 to lead end 12. The crimping allows at least portions of sleeve 20 to attach to portions of a circumference of lead end 12. In some embodiments, the present methods use a hammer on punch 902 to apply force to one or both sides of sleeve 20 to attach, or crimp, the material of sleeve 20 to portions of the circumference of lead end 12. In some embodiments, step 212 of creating holes in lead end 12 comprises inserting punch 902 in one hole in sleeve 20, and using a hammer to push punch 902 through lead end 12 and out an opposing hole on an opposing side of sleeve 20 (not shown).

Figure 10:
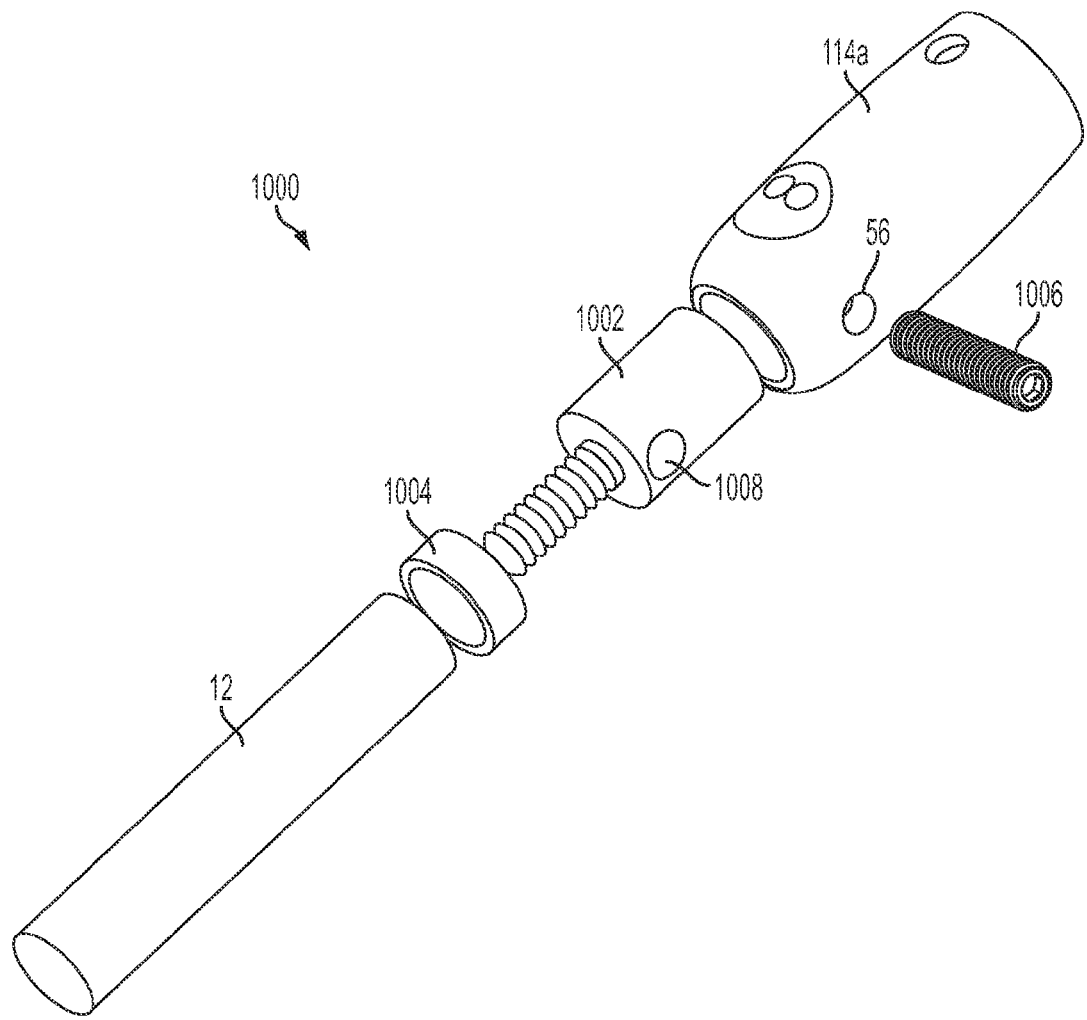
FIG. 10 illustrates an alternate embodiment of a portion of the modular leash.

FIG. 10 illustrates an alternate embodiment of a portion of modular leash 101. Partial flexible portion 1000 for modular leash 101 comprises pin 1002, sleeve 1004 with holes 1008, lead end 12, fastener 1006, and end cap 114a with holes 56. In some embodiments, rather than use separate pin 302 and sleeve 20 as described earlier, the present methods use pin 1002 comprising a single aggregated component with a sleeve. End cap 114a receives pin 1002 for connection with other components of the modular leash. Fastener 1006 connects pin 1002 with end cap 114a. In some embodiments, fastener 1006 is a single roll pin and/or single screw that extends through hole 56 to an opposing hole (not shown) on the other side of end cap 114a. As described earlier, in other embodiments the modular leash uses multiple fasteners, in which one fastener is used for each hole. The present methods may also comprise crimping sleeve 1004 onto lead end 12 to provide additional protection against separation of the modular components.

Figure 11A:
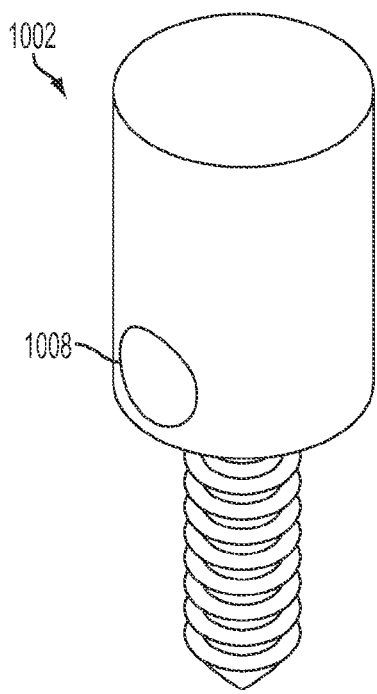
FIGS. 11A-11B illustrate embodiments of a component of the modular leash.
Figure 11B:
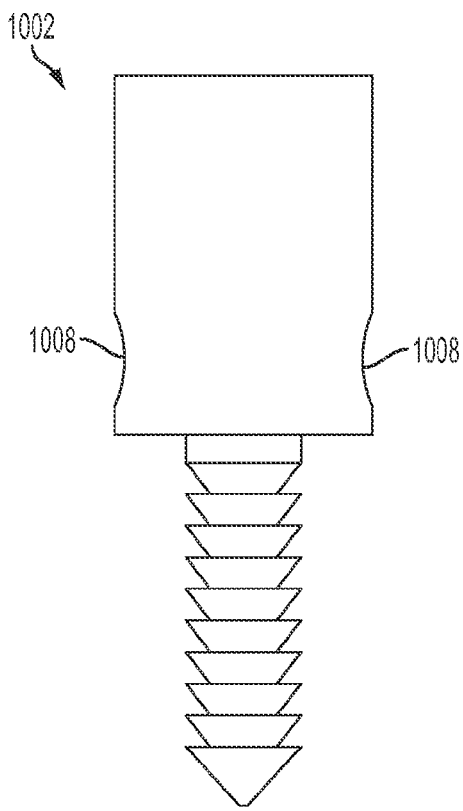

FIGS. 11A-11B illustrate embodiments of a component of modular leash 101. In some embodiments, pin 1002 comprises holes 1008. In some embodiments, pin 1002 is heated as described earlier in connection with FIG. 4. After insertion into lead end 12 (shown in FIG. 1), pin 1002 may be connected to end cap 114a (shown in FIG. 1) by aligning hole 1008 with hole 56 in end cap 114a, and inserting one or more fasteners 70 through the aligned holes to secure pin 302 and lead end 12 to end cap 114a.

Figure 12A:
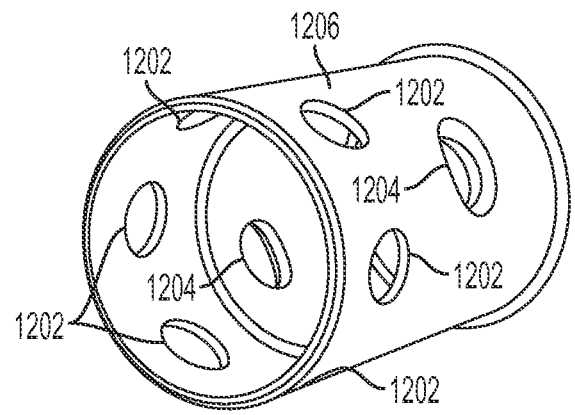
FIGS. 12A-12B illustrate an alternate embodiment of a portion of the modular leash.
Figure 12B:
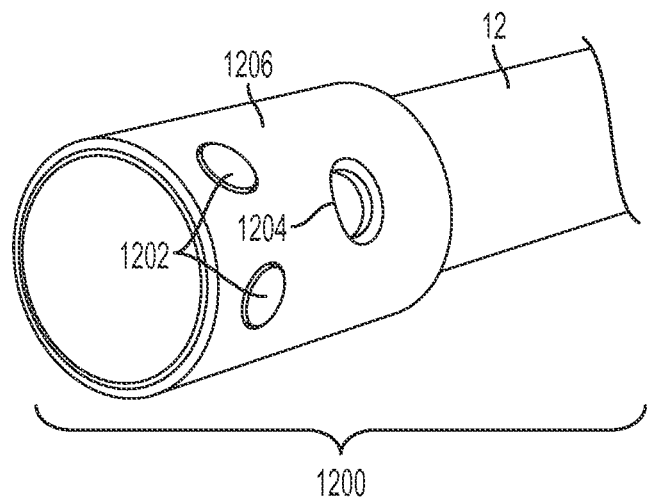

FIGS. 12A-12B illustrate an alternate embodiment of a portion of modular leash 101. FIG. 12A illustrates embodiments of a component of modular leash 101. Sleeve 1206 comprises holes 1202, 1204. In some embodiments, holes 1202, 1204 are arranged generally uniformly to surround sleeve 1206. Advantageously, this arrangement allows substantially similar pressures to be placed on sleeve 1206, thereby avoiding potential deformation of sleeve 1206.

FIG. 12B illustrates an example step for manufacturing flexible portion 1200 of modular leash 101. Some embodiments of partial flexible portion 1200 comprise sleeve 1206. Sleeve 1206 comprises holes 1202 for receiving portions of lead end 12. Sleeve 1206 also comprises holes 1204 for receiving fasteners 70 for an end cap such as end caps 16, 114a (shown in FIG. 1). In some embodiments, step 210 of securing lead end 12 to sleeve 1206 includes heating lead end 12 and/or sleeve 1206 directly, for insertion of lead end 12 into sleeve 1206 (e.g., without pin 302, shown in FIG. 4). For example, securing lead end 12 to sleeve 1206 uses ambient heat from induction heating of sleeve 1206 to at least partially soften and/or melt lead end 12. When at least partially softened and/or melted, portions of lead end 12 fill holes 1202. Accordingly, when lead end 12 sets or cools, lead end 12 adheres to sleeve 1206 using holes 1202.

In other embodiments, step 210 of securing lead end 12 to sleeve 1206 includes crimping sleeve 1206 onto lead end 12 while sleeve 1206 is heated, so that portions of lead end 12 are at least partially melted and/or softened and fill holes 1202. In still other embodiments, holes 1202 are optional and could be eliminated. In further embodiments, sleeve 1206 is arranged with an increased diameter toward one end. Accordingly, step 210 of securing lead end 12 to sleeve 1206 includes "mushrooming" lead end 12 by placing a hot mandrel onto an end of sleeve 1206 to push and compact lead end 12 using a heated "tamper." Advantageously, the heated mandrel causes lead end 12 to increase in diameter when sleeve 1206 has an increased diameter toward one end. The ridge created from the increased diameter serves to trap lead end 12 from escaping sleeve 1206 once tamped into a mushroom shape.

Handle Portion

Figure 13:
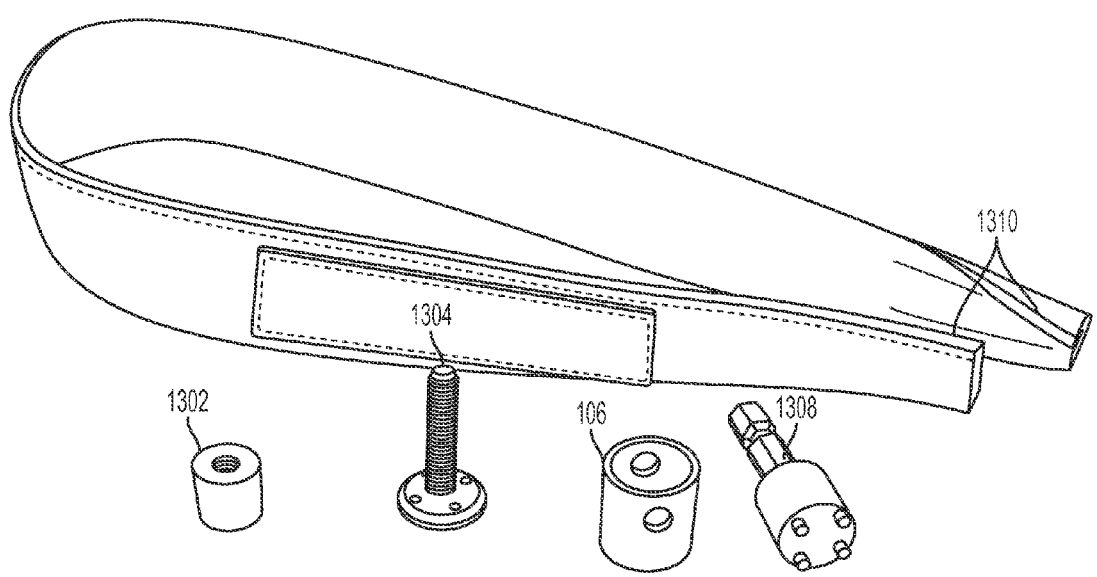
FIG. 13 illustrates example components of the modular leash.

FIG. 13 illustrates example components of modular leash 101. Some embodiments of handle portion 105 comprise fitting 1302 (e.g., a truncated cone), fastener 1304, sleeve 106, driver 1308 for sleeve 106, and handle 100 (shown in FIG. 1) having handle ends 1310. The present methods allow these components to be manufactured into handle portion 105 (shown in FIG. 1).

Figure 14:
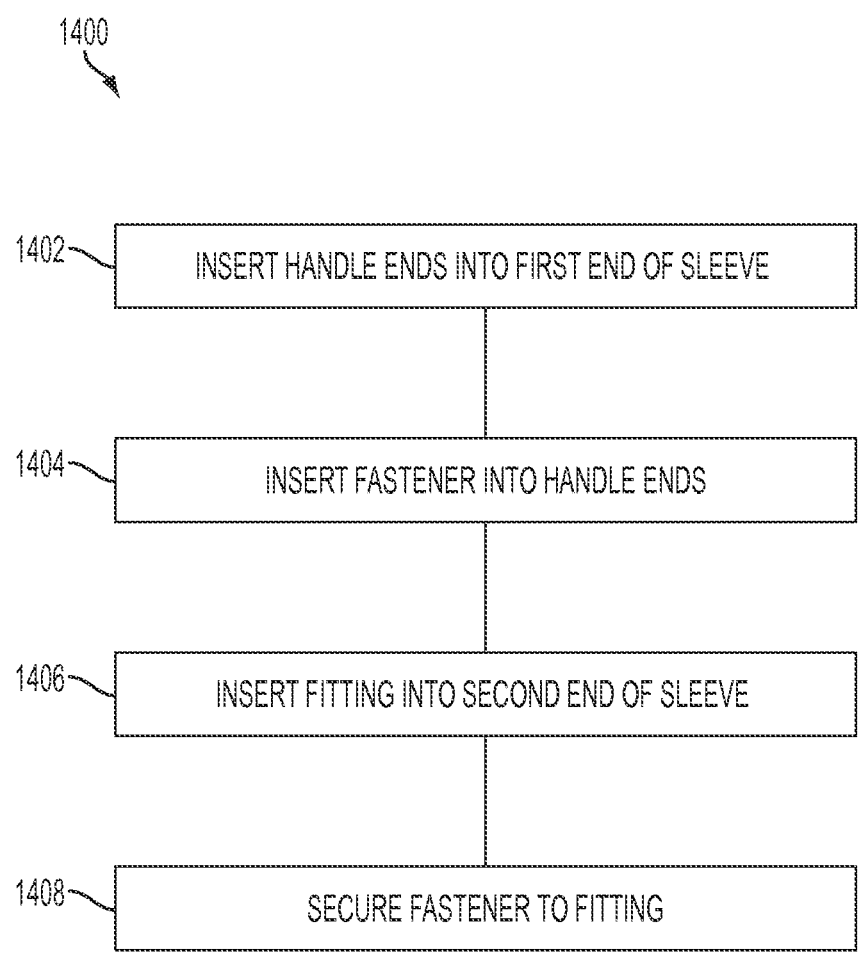
FIG. 14 illustrates an example method for manufacturing the modular leash.

FIG. 14 illustrates an example method 1400 for manufacturing modular leash 101. Method 1400 comprises inserting handle ends 1310 into a first end of sleeve 106 (step 1402). Some embodiments include arranging handle ends 1310 in sleeve 106 to comprise a space suitable for inserting a fastener. Insertion of handle ends 1310 into sleeve 106 is described in further detail below, in connection with FIG. 15. Method 1400 further comprises inserting fastener 1304 into handle ends 1310 (step 1404). For example, fastener 1304 may be inserted into the space formed between handle ends 1310 after they are inserted in sleeve 106. Insertion of fastener 1304 into handle ends 1310 is described in further detail below, in connection with FIG. 18. Method 1400 further comprises inserting fitting 1302 into a second end of sleeve 106 (step 1406). For example, fitting 1302 is inserted into a space formed between handle ends 1310 in the second end of sleeve 106. Insertion of fitting 1302 into sleeve 106 is described in further detail below, in connection with FIG. 19. Optionally, method 1400 further comprises securing fastener 1304 to fitting 1302 (step 1408). In some embodiments, driver 1308 is used to screw fastener 1304 into a corresponding conduit or shaft in fitting 1302. Securing fastener 1304 to fitting 1302 is described in further detail below, in connection with FIG. 22.

Optionally, method 1400 further comprises attaching handle portion 105 to end cap 16. The remainder of modular leash 101 may similarly be attached to end cap 16. Attaching handle portion 105 to end cap 16 is described in further detail below, in connection with FIG. 22.

Figure 15:
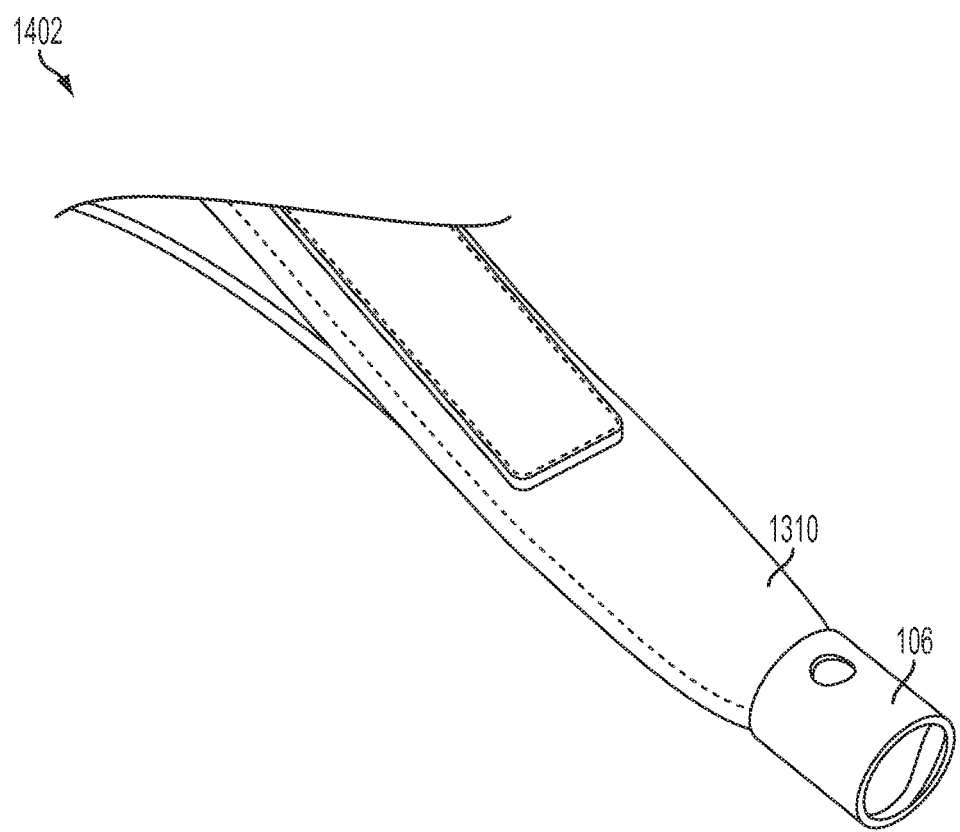
FIG. 15 illustrates an example step for manufacturing the modular leash.

FIG. 15 illustrates an example step 1402 for manufacturing modular leash 101. FIG. 15 includes handle ends 1310 and sleeve 106. Some embodiments include a distal end of sleeve 106 receiving handle ends 1310, so that handle ends 1310 extend through to a proximal end of sleeve 106. Further embodiments include arranging handle ends 1310 such that the completed handle lies flat and smooth, without bunching of the fabric.

Figure 16:
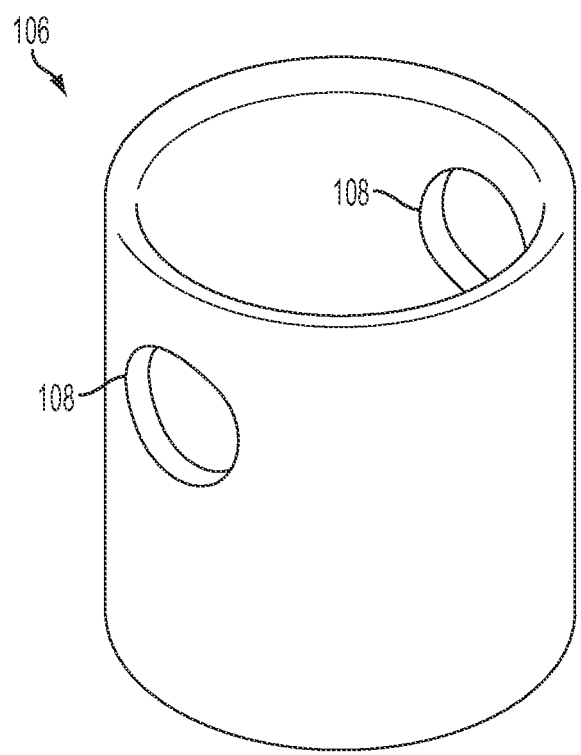
FIG. 16 illustrates embodiments of a component of the modular leash.

FIG. 16 illustrates embodiments of a component of modular leash 101. Sleeve 106 comprises holes 108. In some embodiments, sleeve 106 is about 0.7 inches high. For example, sleeve 106 is 0.653 inches high. In further embodiments, holes 108 have a diameter of about 0.2 inches. For example, holes 108 have a diameter of 0.19 inches. Sleeve 106 may be smaller or larger depending on the size of the handle ends, fastener, and fitting used.

Figure 17A:
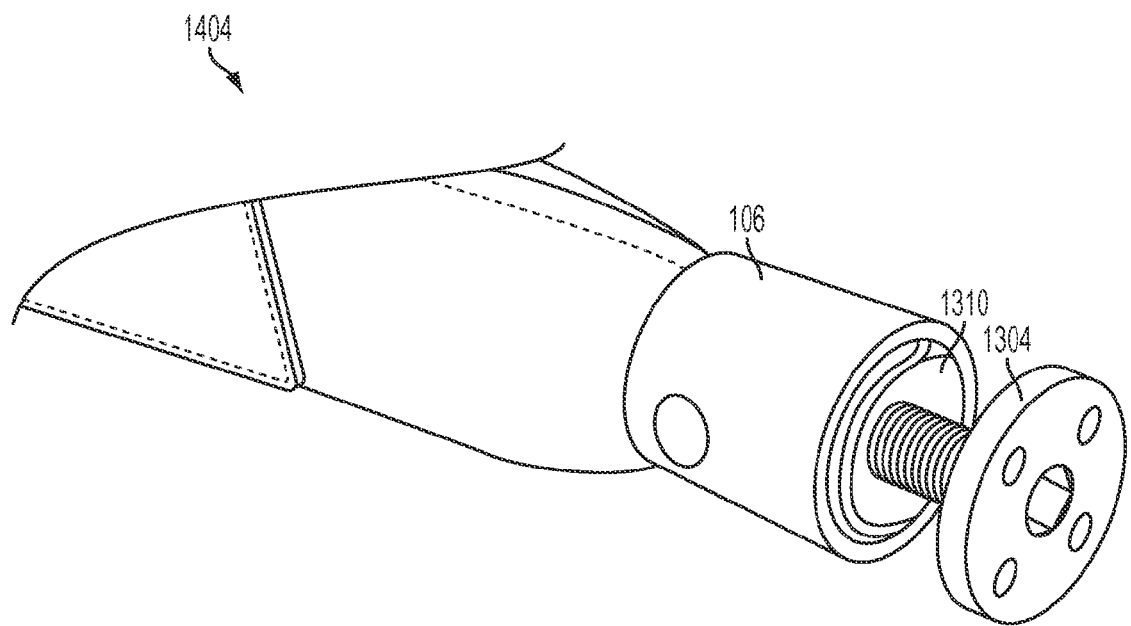
FIGS. 17A-17B illustrate an example step for manufacturing the modular leash.
Figure 17B:
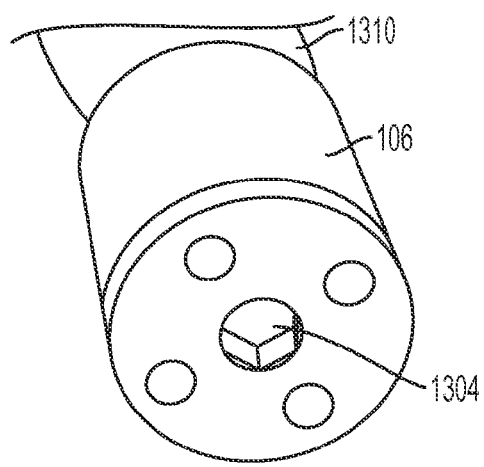

FIGS. 17A-17B illustrate an example step 1404 for manufacturing modular leash 101. FIG. 17A includes handle ends 1310, sleeve 106, and fastener 1304. In some embodiments, inserting fastener 1304 into handle ends 1310 comprises inserting fastener 1304 through a first end of sleeve 106 into a space formed between handle ends 1310. For example, the first end of sleeve 106 is a proximal end of sleeve 106. FIG. 17B includes handle ends 1310, sleeve 106, and fastener 1304. In some embodiments, inserting fastener 1304 into handle ends 1310 comprises positioning fastener 1304 flush with an end of sleeve 106.

Figure 18A:
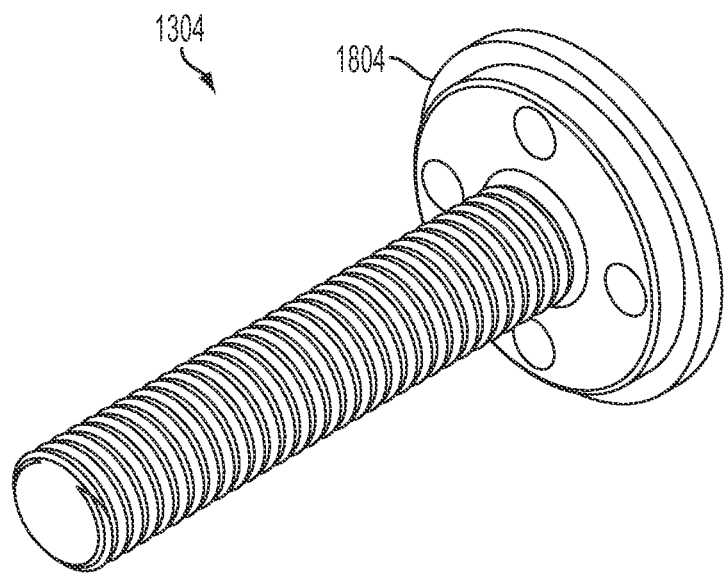
FIGS. 18A-18B illustrate embodiments of a component of the modular leash.
Figure 18B:
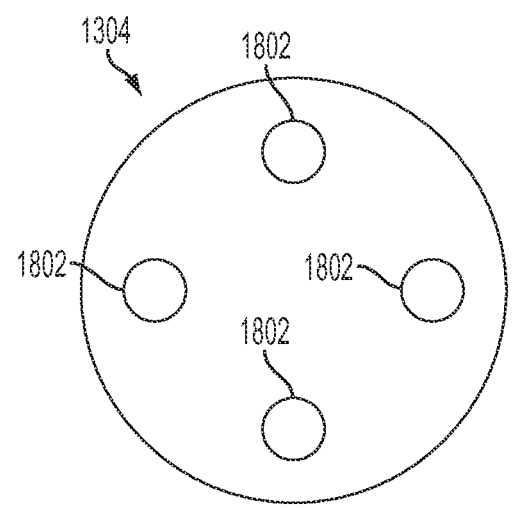

FIGS. 18A-18B illustrate embodiments of a component for manufacturing modular leash 101. Non-limiting examples of fastener 1304 include roll pins, screws, and/or set screws. In some embodiments, fastener 1304 is about 1.2 inches long. For example, fastener 1304 is 1.11 inches long. Cap 1804 on fastener 1304 is about 0.6 inches in diameter. For example, cap 1804 is 0.58 inches in diameter. Fastener 1304 comprises threads of $^{10}/_{32}$ inches. Fastener 1304 may be larger or smaller to correspond with a size of a desired sleeve or thickness of desired handle ends.

Some embodiments include fastener 1304 comprising holes 1802. The sizes and positions of holes 1802 correspond with matching spokes on a customized driver, so that fastener 1304 may be turned to secure to fitting 1302. Holes 1802 have a diameter of about 0.1 inches. For example, holes 1802 have a diameter of 0.08 inches.

Figure 19:
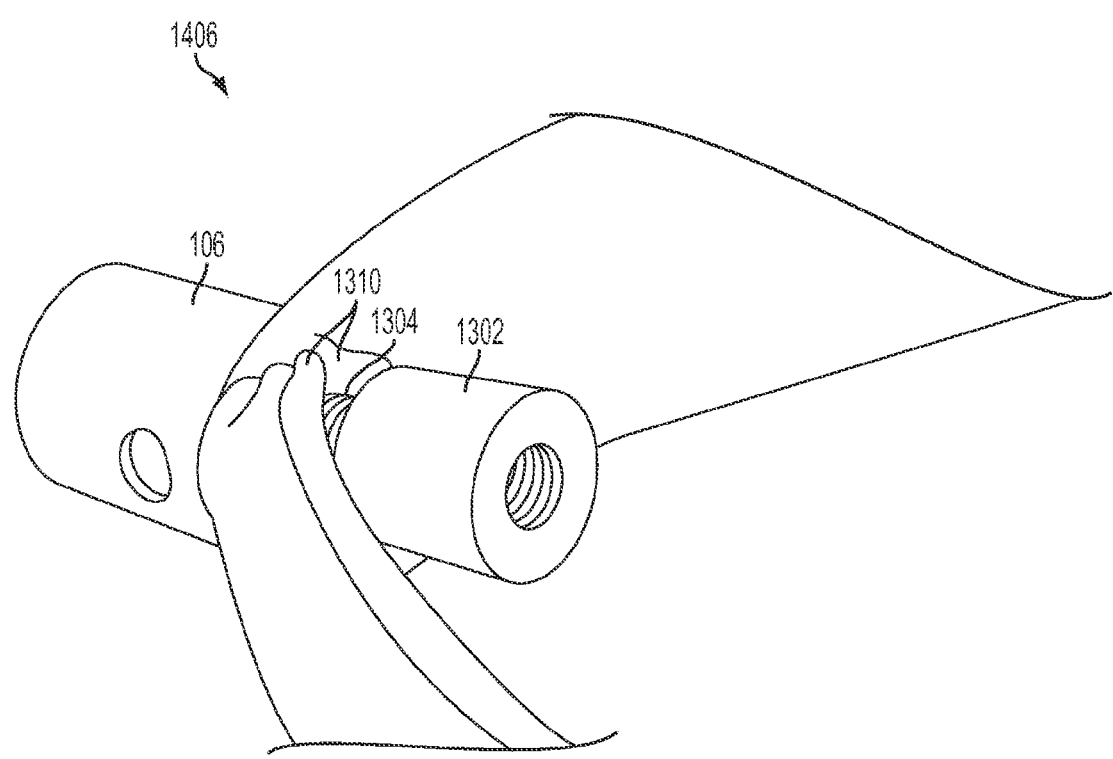
FIG. 19 illustrates an example step for manufacturing the modular leash.

FIG. 19 illustrates an example step 1406 for manufacturing modular leash 101. FIG. 19 includes sleeve 106, fastener 1304, handle ends 1310, and fitting 1302. In some embodiments, inserting fitting 1302 into a second end of sleeve 106 comprises placing fitting 1302 on a threaded shaft of fastener 1304. For example, the second end of sleeve 106 is a distal end of sleeve 106. Fastener 1304 is inserted into a first end of sleeve 106. For example, the first end of sleeve 106 is a proximal end of sleeve 106. In some embodiments, fitting 1302 fits within a space between sleeve 106 and handle ends 1310. Advantageously, the relative positioning maintains a desired orientation of the handle without bunching or wrinkling.

Figure 20:
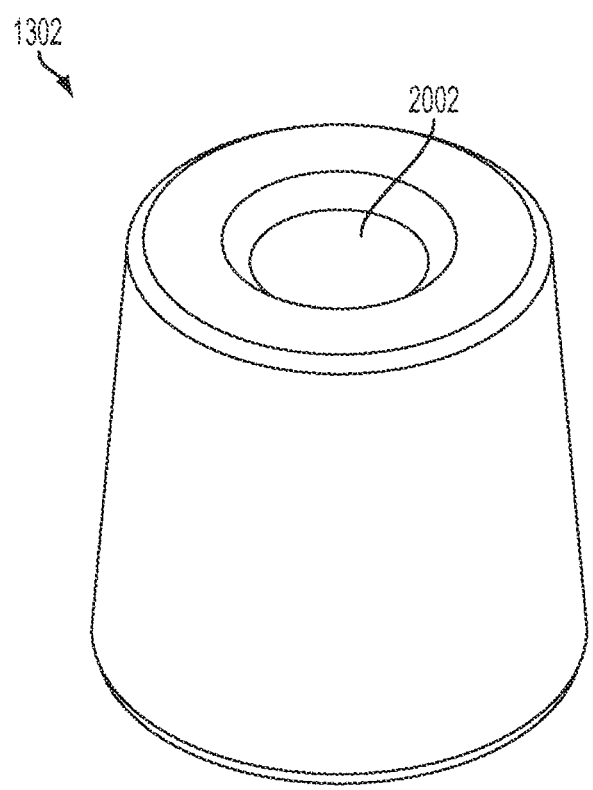
FIG. 20 illustrates embodiments of a component of the modular leash.

FIG. 20 illustrates embodiments of a component of modular leash 101. Non-limiting examples of fitting 1302 include a frustum, cylinder, or any other geometrical shape arranged to fit within or around sleeve 106. A frustum refers to a geometrical shape such as a "truncated" cone, "truncated" pyramid or other "truncated" geometrical solid. Fitting 1302 further comprises conduit 2002. In some embodiments, fitting 1302 is tapered. For example, fitting 1302 is tapered 4° off the 90° perpendicular, or 86°. A top end of fitting 1302 is 0.374 inches in diameter, and a bottom end of fitting 1302 is 0.431 inches in diameter. In some embodiments, fitting 1302 is about 0.4 inches tall. For example, fitting 1302 is 0.438 inches tall. Conduit 2012 is designed to receive fastener 1304 (not shown), for securing fastener 1304 to fitting 1302. This step is described in further detail below, in connection with FIG. 21.

In some embodiments, fastener 1304 and fitting 1302 may be combined into a single component. Accordingly, a separate fitting 1302 is not needed with a combined component. The combined fastener and fitting is secured to sleeve 106 by inserting the combined fastener and fitting into sleeve 106. The combined fastener and fitting secures handle ends 1310 to sleeve 106.

Figure 21A:
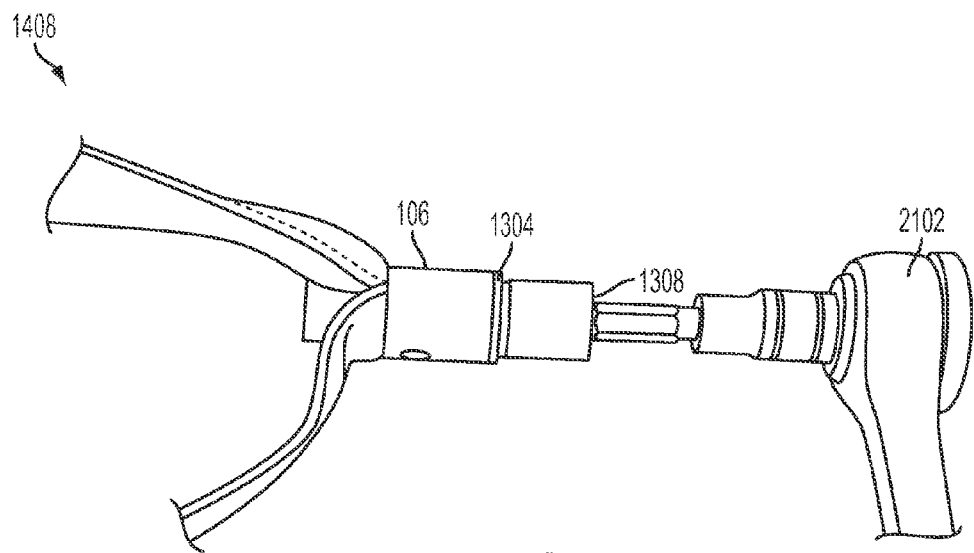
FIGS. 21A-21B illustrate an example step for manufacturing the modular leash.
Figure 21B:
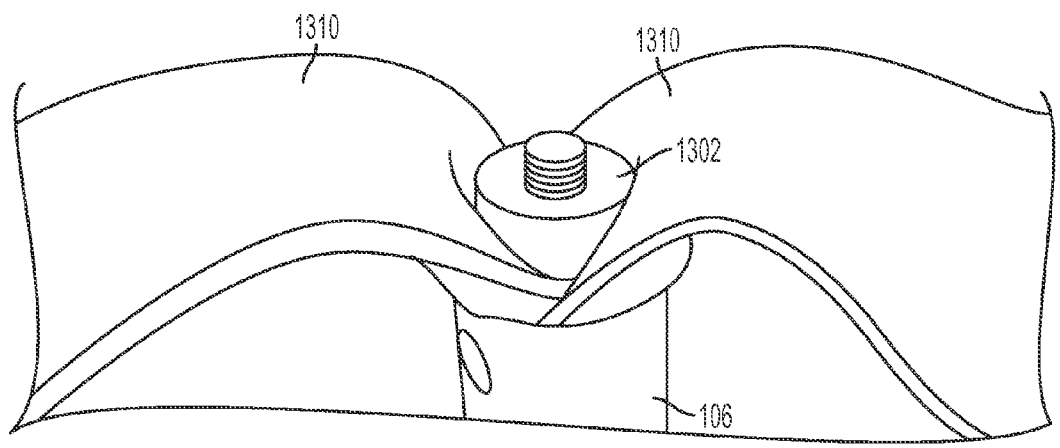

FIGS. 21A-21B illustrate an example step 1408 for manufacturing modular leash 101. FIG. 21A includes fastener 1304, driver 1308, and wrench 2102. Some embodiments include customizing driver 1308 to fit corresponding holes in fastener 1304. In some embodiments, securing fastener 1304 to fitting 1302 comprises using customized driver 1308 to turn fastener 1304 while keeping sleeve 106 steady. In alternate embodiments, fastener 1304 comprises a standard head for receiving a screwdriver or wrench. Accordingly, driver 1308 may be avoided and a manufacturer may use a screwdriver or other tool to turn fastener 1304.

Turning fastener 1304 allows fitting 1302 to draw handle ends 1310 into a space between fitting 1302 and sleeve 106. FIG. 21B illustrates handle ends 1310, fitting 1302, and sleeve 106. Some embodiments include sizing fitting 1302 and sleeve 106 to create a space between fitting 1302 and sleeve 106 to fit handle ends 1310. Advantageously, turning fastener 1304 allows fitting 1302 to draw in handle ends 1310 smoothly and with less bunching. Accordingly, the present methods allow a handle to maintain a desired orientation.

Figure 22A:
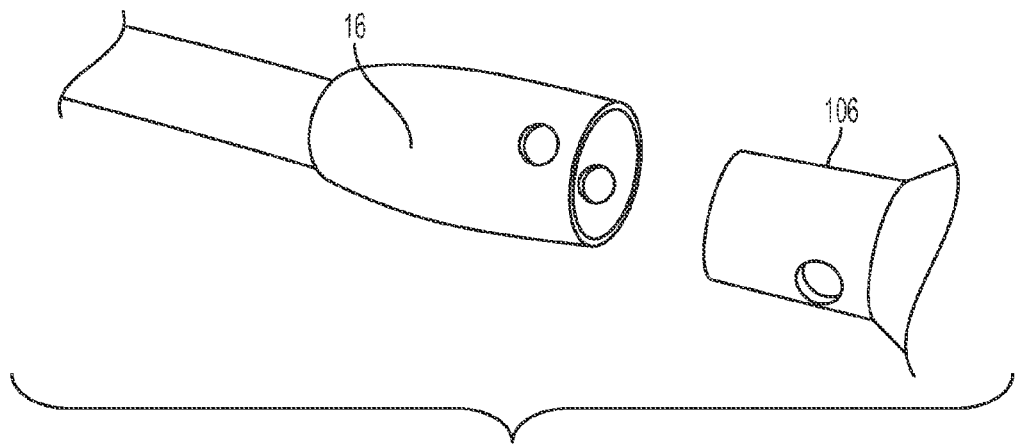
FIGS. 22A-22C illustrate an example step for manufacturing the modular leash.
Figure 22B:
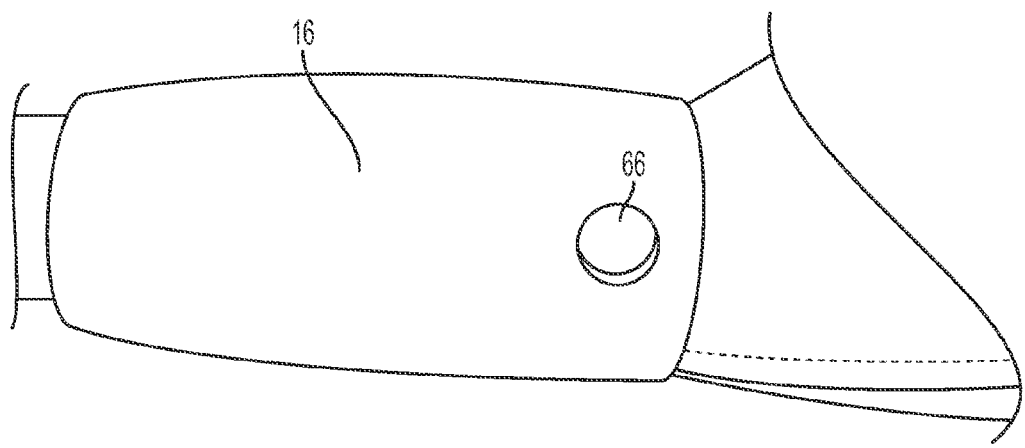
Figure 22C:
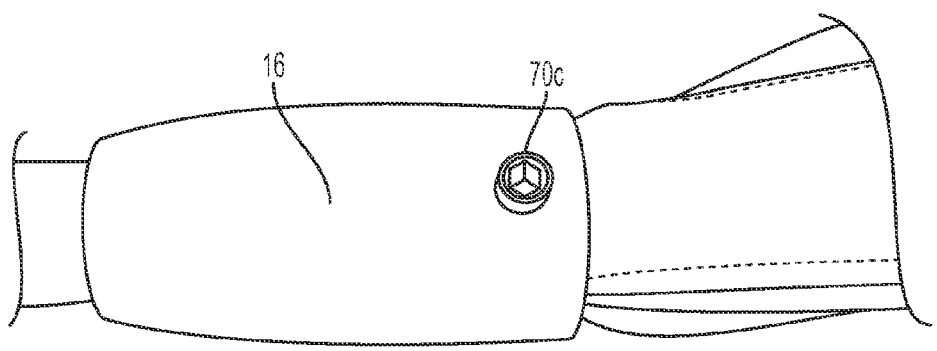

FIGS. 22A-22C illustrate an example step for manufacturing modular leash 101. FIG. 22A includes end cap 16 and sleeve 106. In some embodiments, attaching handle portion 105 (shown in FIG. 1) to end cap 16 comprises inserting sleeve 106 into end cap 16. FIG. 22B includes end cap 16 having hole 66. Inside end cap 16 are sleeve 106 with hole 108 (shown in FIG. 1). In some embodiments, attaching handle portion 105 to end cap 16 comprises aligning hole 66 of end cap 16 with hole 108 of sleeve 106. FIG. 22C includes end cap 16 and fastener 70. In some embodiments, attaching handle portion 105 to end cap 16 comprises securing fastener 70 to end cap 16.

Although specific steps are disclosed in FIGS. 2 and 14, such steps are exemplary. That is, the present methods are well-suited for including various other steps or variations of the steps recited in FIGS. 2 and 14. The steps in FIGS. 2 and 14 may be performed in an order different than presented, and not all of the steps may be performed.

The present disclosure has made reference in detail to various embodiments, examples of which are illustrated in the accompanying drawings. While the present methods have been described in conjunction with various embodiments, these various embodiments are not intended to limit the present disclosure. On the contrary, the present disclosure is intended to cover alternatives, modifications, and equivalents, which may be included within the scope of the present methods as construed according to the appended claims. Furthermore, in the detailed description of various embodiments, numerous specific details have been set forth in order to provide a thorough understanding of the present methods. However, the present methods may be practiced without these specific details. In other instances, well known methods, procedures, and components have not been described in detail, so as not to unnecessarily obscure aspects of the present disclosure.

The foregoing descriptions of specific embodiments of the present methods have been presented for purposes of illustration and description. The specific embodiments are not intended to be exhaustive or to limit the present methods to the precise forms disclosed, and many modifications and variations are possible in light of the above description. The embodiments were chosen and described in order to best explain the principles of the present methods and their practical application, to thereby enable others skilled in the art to best utilize the present disclosure and various embodiments with various modifications as are suited to the particular use contemplated. It is intended that the scope of the present methods be defined by the claims appended hereto and their equivalents.

What is claimed is:

1. A method of manufacturing a flexible portion of a modular leash, the method comprising:
   providing a lead comprised of rope that is capable of melting, and a pin comprised of metal, wherein the lead comprises an end, and the pin comprises ridges and a cap;
   heating the pin; and
   inserting the heated pin into the lead end to at least partially melt the lead end to the ridges of the pin using ambient heat from the heated pin.

2. The method of claim 1, further comprising
   providing a sleeve comprised of metal;
   inserting the lead end with the inserted pin into the sleeve, the sleeve surrounding at least a portion of the lead end; and
   securing the lead end with the inserted pin to the sleeve by crimping the sleeve to the lead end with the inserted pin.

3. The method of claim 2, wherein the pin and the sleeve are combined into a single component.

4. The method of claim 2,
   wherein the sleeve comprises a plurality of holes, and
   wherein the method further comprises creating opposing holes in the lead end to correspond with the plurality of holes in the sleeve, the plurality of holes in the sleeve for receiving at least one fastener.

5. The method of claim 2, wherein the sleeve comprises at least one of aluminum, steel, brass, and titanium.

6. The method of claim 1, wherein the step of heating the pin further comprises using induction heating.

7. The method of claim 1, wherein the lead comprises at least one of plastic, nylon, webbing, polypropylene, hemp, chain, polyurethane, leather, rubber, and synthetic materials.

8. The method of claim 1, wherein inserting the heated pin into the lead end comprises using a machine to move the pin forward into the lead end until the cap of the pin is flush with the lead end.

9. The method of claim 1, wherein inserting the heated pin into the lead end further at least partially melting the lead end to the cap of the pin using ambient heat from the heated pin.

10. A method of manufacturing a flexible portion of a modular leash, the method comprising:
    providing a lead comprised of rope that is capable of melting, and a sleeve comprised of metal, wherein the lead comprises an end, and the sleeve comprises holes;
    inserting the lead end into the sleeve;
    heating the sleeve to at least partially melt the lead end to the sleeve using ambient heat from the heated sleeve, wherein the at least partially melted lead end fills the holes; and
    crimping the sleeve onto the lead end while the sleeve is heated.

11. The method of claim 10, wherein the sleeve comprises at least one of aluminum, steel, brass, and titanium.

12. The method of claim 10, wherein the step of heating the sleeve further comprises using induction heating.

13. The method of claim 10, wherein the lead comprises at least one of plastic, nylon, webbing, polypropylene, hemp, chain, polyurethane, leather, rubber, and synthetic materials.

14. A method of manufacturing a handle portion of a modular leash, the method comprising:
    providing a sleeve, a fastener, a fitting, and a handle, wherein the handle comprises a plurality of ends, and wherein the handle further comprises a flexible material;
    inserting the handle ends into a first end of the sleeve, wherein the sleeve surrounds at least a portion of the handle ends and a space is formed between the handle ends after the handle ends are inserted into the first end of the sleeve;
    inserting the fastener into a second end of the sleeve opposite the first end of the sleeve and into the space formed between the handle ends, such that the handle ends at least partially surround the fastener and the sleeve at least partially surrounds the fastener and the handle ends;
    inserting the fitting into the first end of the sleeve; and
    securing the inserted fitting to the fastener.

15. The method of claim 14, wherein the fastener secures the handle ends to the sleeve.

16. The method of claim 14, wherein the fitting secures the handle ends to the sleeve.

17. The method of claim 16, wherein the fitting comprises at least one of a frustum, a cylinder, and a geometrical solid.

18. The method of claim 16, wherein the fitting comprises at least one of aluminum, steel, brass, and titanium.

19. The method of claim 14,
    wherein the fastener is threaded, and
    wherein the fitting is threaded to mate with the fastener.

20. The method of claim 14, wherein the flexible material of the handle comprises at least one of nylon, polyester, and cotton.

* * * * *